US010209550B2

(12) United States Patent
Liu

(10) Patent No.: US 10,209,550 B2

(45) Date of Patent: Feb. 19, 2019

(54) SECURING A TOUCH SENSOR ASSEMBLY FOR A TOUCH BUTTON

(71) Applicant: TEXAS INSTRUMENTS INCORPORATED, Dallas, TX (US)

(72) Inventor: Dongtai Liu, Fremont, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/727,737

(22) Filed: Oct. 9, 2017

(65) Prior Publication Data

US 2018/0101040 A1 Apr. 12, 2018

Related U.S. Application Data

(60) Provisional application No. 62/405,980, filed on Oct. 9, 2016.

(51) Int. Cl.

*G02F 1/1333* (2006.01)
*G06F 3/044* (2006.01)

(Continued)

(52) U.S. Cl.

CPC ............ *G02F 1/13338* (2013.01); *G06F 1/16* (2013.01); *G06F 3/044* (2013.01); *G06F 3/0414* (2013.01);

(Continued)

(58) Field of Classification Search

CPC ........ G02F 1/13338; G06F 1/16; G06F 3/044; G06F 3/0414; G06F 3/0412; H04M 1/026; H04M 2250/22

See application file for complete search history.

(56) References Cited

U.S. PATENT DOCUMENTS

2011/0122085 A1 5/2011 Chang
2012/0092303 A1 4/2012 Huguenard (Continued)

FOREIGN PATENT DOCUMENTS

CN 202737840 U 2/2013
JP 2011145921 A 7/2011

OTHER PUBLICATIONS

PCT Search Report for Application No. PCT/US 2017/055763, dated Jan. 25, 2018.

*Primary Examiner* — Abbas Abdulselam

(74) *Attorney, Agent, or Firm* — Andrew Viger; Charles A. Brill; Frank D. Cimino

(57) ABSTRACT

A touch button structure for a mobile communications or other device, including a sensor slot with front-side and back-side slot walls formed in the device wall, an interior surface of a touch button area forming the front-side slot wall, and a sensor component inserted within the sensor slot. The sensor component includes a sense element operable to sense a touch-deflection of the front-side slot wall toward the sense element in response to a touch-press of the touch button, and front-side and back-side elastic insulating retention laminates affixed to the front/back-side of the sense element. The front/back-side elastic laminates being compressible for insertion of the sensor component into the sensor slot, and when inserted, are decompressible to contact respectively the front-side and back-side slot walls, and at least the front-side elastic laminate is compressible in response to a deflection of the front-side slot wall in the direction of the sense element.

20 Claims, 5 Drawing Sheets

13
100A
15A
17A
13E
15B
17B
100B
13E

(51) Int. Cl.
*H04M 1/02* (2006.01)
*G06F 1/16* (2006.01)
*G06F 3/041* (2006.01)

(52) U.S. Cl.
CPC ........... *H04M 1/026* (2013.01); *G06F 3/0412* (2013.01); *H04M 2250/22* (2013.01)

(56) References Cited

U.S. PATENT DOCUMENTS

2015/0147962 A1* 5/2015 Park ...................... H04W 12/06
455/41.1
2017/0371380 A1* 12/2017 Oberhauser ........... G06F 1/1692

* cited by examiner

SECURING A TOUCH SENSOR ASSEMBLY FOR A TOUCH BUTTON

CROSS-REFERENCE TO RELATED APPLICATIONS

Priority is claimed under 37 CFR 1.78 and 35 USC 119(e) to U.S. Provisional Application 62/405,980, filed 2016 Oct. 9, which is incorporated by reference.

BACKGROUND

Technical Field

This Patent Disclosure relates to touch input, such as touch buttons or keys, such as for use in personal computing/communication devices.

Related Art

Mobile/portable personal communications/computing devices commonly include physical/mechanical buttons integrated into a device case (such as on a side-wall edge). Such mechanical touch buttons are distinguished from, for example, capacitive touch buttons defined on a device screen.

Touch sensing technology can be used to replace these physical/mechanical buttons. Touch sensing can be used to detect touch-press of a touch button defined on a touch button surface, such as based on touch surface deflection/displacement. A touch sensor assembly is disposed within the device case at the interior-side of the touch button area. Touch sensing can be based on inductive sensing with a sensor inductor coil, or capacitive sensing with a sensor capacitive electrode, or resistive sensing with a sensor pressure-sensitive resistor.

While this Background information references touch input for mobile/personal communication/computing devices, this Patent Disclosure is more generally directed to touch input buttons/keys.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for securing a touch sensor assembly for a touch button, such as for use in a mobile communications device.

According to aspects of the Disclosure, a touch sensor structure can be used in a device including at least one touch button for touch input, the device including a touch button area defined on a device wall to include an exterior touch button surface. The touch sensor structure can include a sensor slot and a sensor component inserted within the sensor slot and spaced from the front-side and back-side slot walls. The sensor slot can include front-side and back-side slot walls formed in the device wall at the touch button area, an interior surface of the touch button area forming the front-side slot wall. The sensor component can include a sense element operable to sense a touch-deflection of the front-slide slot wall toward the sense element in response to a touch-press of the touch button surface, and front-side and back-side elastic retention laminates affixed respectively to a front-side and a back-side of the sense element: the front/back-side elastic retention laminates being compressible for insertion of the sensor component into the sensor slot, and, when the sensor component is inserted within the sensor slot, decompressible to contact respectively the front-side and back-side slot walls.

According to other aspects of the Disclosure, a touch sensor assembly can be used in a device including at least one touch button for touch input, the device including a touch button area defined on a device wall to include an exterior touch button surface, the device including a sensor slot with front-side and back-side slot walls formed in the device wall at the touch button area, an interior surface of the touch button area forming the front-side slot wall. The touch sensor assembly can include a sensor component with a sense element operable to sense a touch-deflection of the front-slide slot wall toward the sense element in response to a touch-press of the touch button surface, and can include front-side and back-side elastic retention laminates affixed respectively to a front-side and a back-side of the sense element, with the front/back-side elastic retention laminates being compressible for insertion of the sensor component into the sensor slot, and, when the sensor component is inserted within the sensor slot, decompressible to contact respectively the front-side and back-side slot walls.

According to other aspects of the Disclosure, a method of providing touch input can be used with a device including at least one touch button area defined on a device wall to include an exterior touch button surface. The method includes: forming in the device wall at the touch button area a sensor slot with front-side and back-side slot walls, an interior surface of the touch button area forming the front-side slot wall; providing a sense element operable to sense a touch-deflection of the front-slide slot wall toward the sense element in response to a touch-press of the touch button surface; and affixing to the sense element front-side and back-side elastic retention laminates affixed respectively to a front-side and a back-side of the sense element. The method further includes: compressing the front-side and back-side elastic retention laminates; inserting the sense elements with front-side and back-side elastic retention elements compressed into the sensor slot; and allowing the front-side and back-side elastic retention laminates to decompress to contact respectively the front-side and back-side slot walls.

Other aspects and features of the invention claimed in this Patent Document will be apparent to those skilled in the art from the following Disclosure.

BRIEF DESCRIPTION OF THE DRAWINGS

FIG. 2A illustrates an example touch sensor [220] implemented as a Flex PCB [221] with a printed sense inductor coil [222] and trace interconnects to a trace coupler [223, 224] for coupling to sensor electronics (not shown); FIG. 2B illustrates an example elastic, insulating retention laminate [230]; and FIG. 2C illustrates an example touch sensor assembly [210] with front/back side elastic retention laminates [230AB] affixed to the example touch sensor Flex PCB [221].

FIGS. 3A-3B illustrate the example touch sensor assembly [310] with front/back-side elastic retention laminates uncompressed [FIG 3A, 330A1/330B1], and compressed [FIG 3B, 350A2/350B2] for insertion into a touch sensor slot; FIGS. 3C-3D illustrate an example touch button structure [300] with the example touch sensor assembly [310] (including a touch sensor [321]) inserted within a sensor slot [37], with the front/back-side retention laminates compressed for insertion [FIG 3C, 330A2/330B2], and after decompression [FIG 3D, 330A1/330B1], with the touch sensor assembly secured within the sensor slot by the decompressed front/back-side retention laminates in contact with the slot walls.

FIG. 4A illustrates an example device [40A] with an adhered back panel [44A]; and FIG. 4B illustrates an alternate example device [40B] with a monolithic back panel [44B].

FIG. 5A illustrates the dual touch sensor [520] including dual touch sensor PCBs [521A/521B]; FIG. 5B illustrates an example dual touch sensor assembly [510A] with dual touch sensors [521A, 521B], and with associated front/back-side elastic retention laminates [530AB]; and FIG. 5C illustrates an alternate example dual touch sensor assembly [510B] with dual touch sensors [521A, 521B], and with a conductive laminate (such as copper) [560A, 560B] over the front/back-side elastic retention laminates [530AB], such as for use with a plastic device case (including plastic touch sensor slot).

DETAILED DESCRIPTION

Figure 1A:
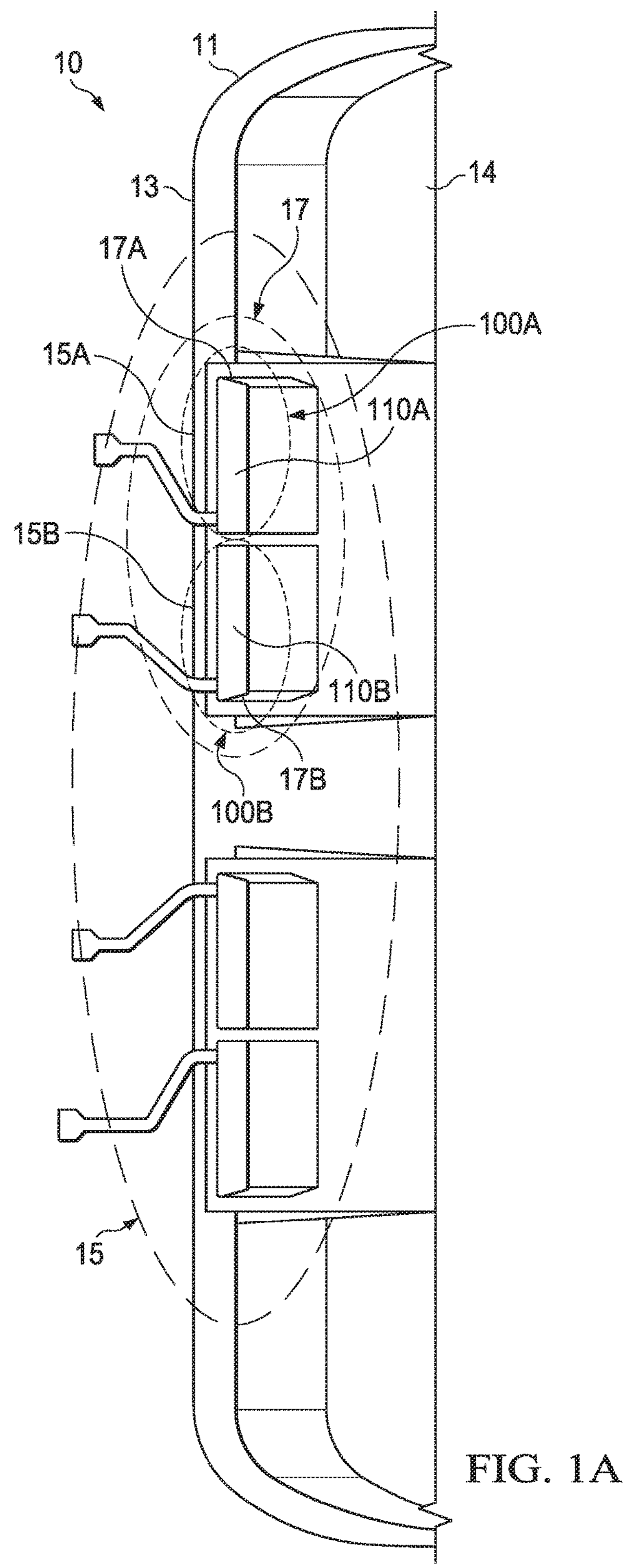
FIGS. 1A-1B illustrates an example mobile communications device case [10] including two dual touch buttons [15] (shown in detail in FIG. 1B), each touch button structure [100A] including a touch sensor slot [17A] at the interior side of the touch button area [15A], and having an inserted touch sensor assembly [110A], the touch sensor assembly retained/secured within the touch sensor slot by elastic retention laminates [FIG 1A-1C] according to aspects of this Disclosure.

This Description and the Drawings constitute a Disclosure for structure and methods for securing a touch sensor assembly for a touch button within a device, including describing design examples (example implementations), and illustrating various technical features and advantages.

In an example application, a touch button apparatus according to the Disclosure can be used to implement one or more touch buttons for a mobile communications device using touch sensing technology, such as with inductive, capacitive, or resistive (pressure-sensitive) sensing. Each touch button is defined at a touch button area of the device case (such as on a sidewall of the device case). The touch button apparatus enables installing/securing an associated touch sensor assembly, including a touch sensor (such as a sense inductor coil), within the device case, at the interior side of the touch button area.

This Disclosure uses the following nomenclature: "touch button" means a touch input area defined on a segment of equipment housing such as a side-wall of a device case, such as for a mobile communications device, the touch area having an exterior touch surface, and an interior surface; "touch sensor slot" means a slot disposed at the interior side of a touch button area with the interior touch button surface forming a front-sidewall of the touch sensor slot; "touch sensor assembly" means a touch sensor implemented as a sensor printed circuit board (PCB), such as a flexible PCB (Flex PCB), including a touch sensor element (inductive sense coil, capacitive sense electrode, pressure-sensitive resistor) formed (such as printed) on the sensor PCB with trace interconnect including a trace connector to sensor electronics (co-located such as on the sensor PCB or remote from the sensor), the touch sensor assembly including front/back-side elastic retention laminates affixed (such as adhered) to the front and back side of the sensor PCB; "elastic retention laminates" means elastic, insulating layers or pads that are affixed (such as adhered) to the front and back side of a sensor PCB forming front/back-side laminates that are elastically compressible/decompressible and electrically insulating; and "touch sensor structure" means the touch sensor slot with the touch sensor assembly inserted and secured within the slot by the elastic retention laminates that are compressed for insertion and then decompress to contact at least front and back side slot walls.

In brief overview, a touch button structure for a mobile communications or other device, includes a sensor slot with front-side and back-side slot walls formed in the device wall, an interior surface of a touch button area forming the front-side slot wall, and a sensor component inserted within the sensor slot. The sensor component includes a sense element operable to sense a touch-deflection of the front-slide slot wall toward the sense element in response to a touch-press of the touch button, and front-side and back-side elastic insulating retention laminates (such as memory or shock absorbing foam) affixed to the front/back-side of the sense element. The front/back-side elastic laminates being compressible for insertion of the sensor component into the sensor slot, and when inserted, are decompressible to contact respectively the front-side and back-side slot walls, and at least the front-side elastic laminate is compressible in response to a deflection of the front-side slot wall in the direction of the sense element. The sense element can be implemented as a flexible printed circuit board. Sensing can be inductive, capacitive or resistive (with a pressure-sensitive resistive element). A conductive laminate can be affixed to the front-side elastic retention laminate, to provide a conductive target such as for use with a nonconductive (such as plastic) device body.

Figure 1B:
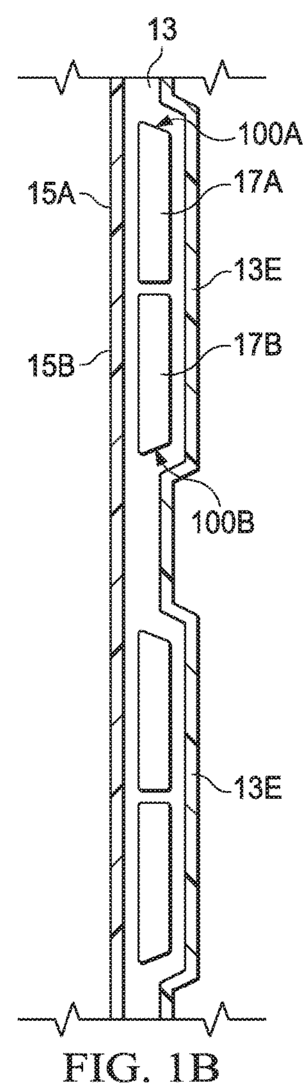
Figure 2A:
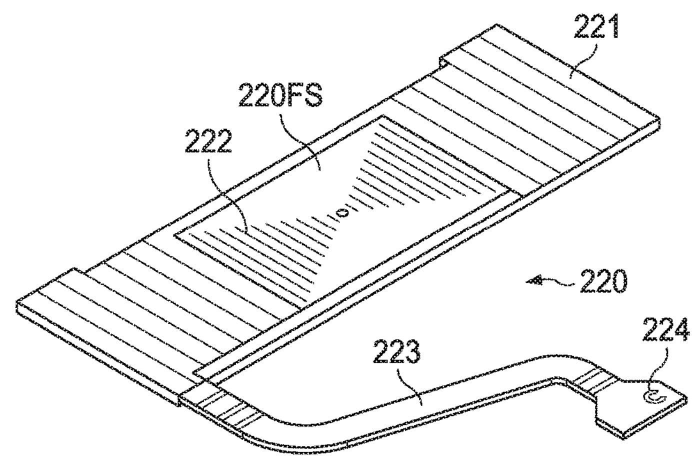
FIGS. 2A-2C illustrates an example touch sensor assembly [210]
Figure 2B:
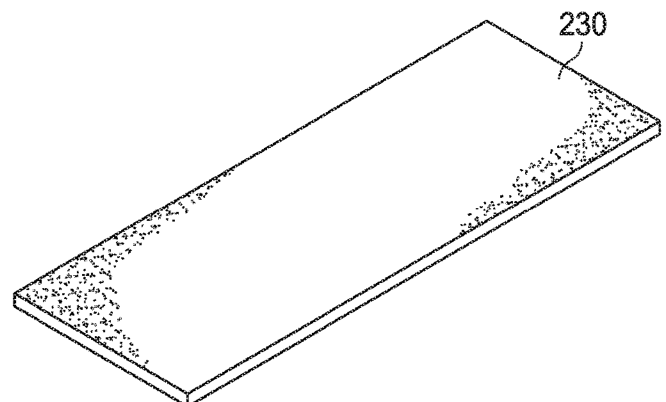
Figure 2C:
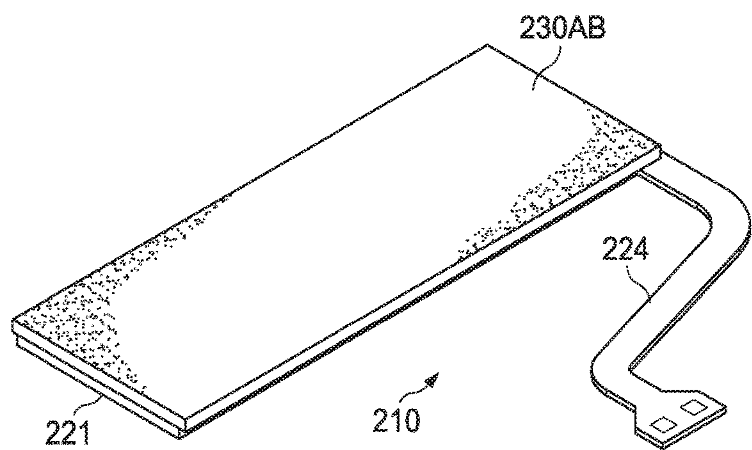
Figure 4A:
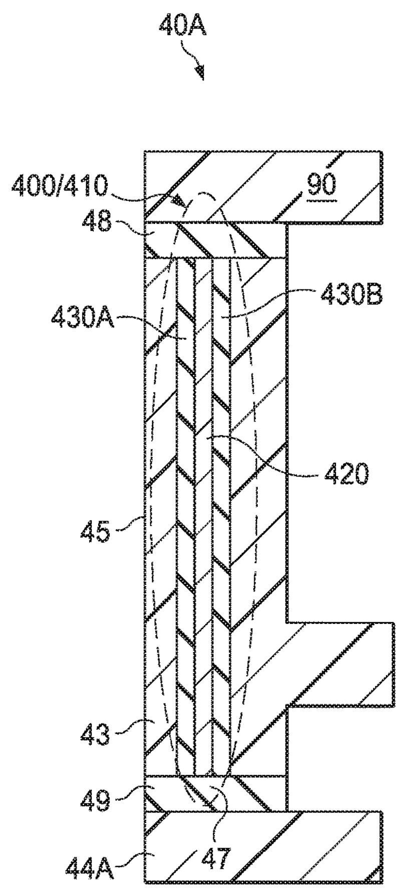
FIGS. 4A-4B illustrate example devices [40A, 40B] with touch buttons [45] implemented with example touch sensor structures [400], including an example touch sensor assembly [410] (touch sensor 421] secured within a touch sensor slot [47] by front/back-side elastic retention laminates [430A/430B]
Figure 4B:
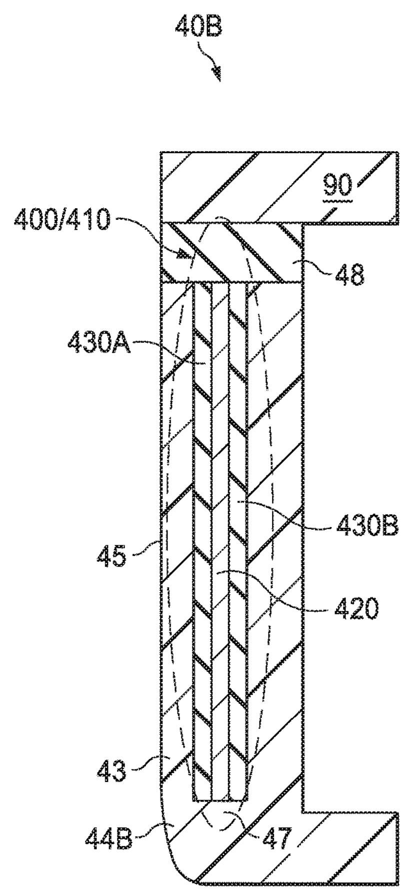
Figure 5A:
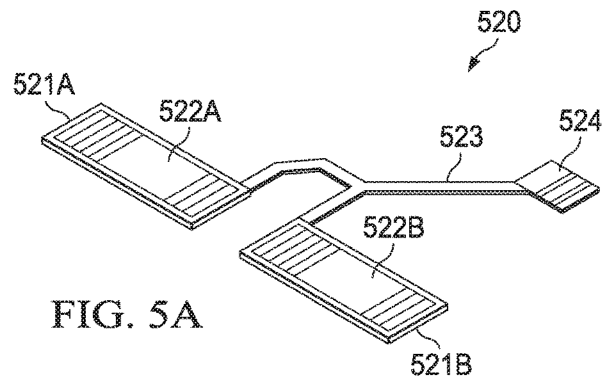
FIGS. 5A-5C illustrate example dual touch sensor assemblies [510A, 510B] with dual touch sensor PCBs [520, 521A/521B] with a center coupler [523/524]
Figure 5B:
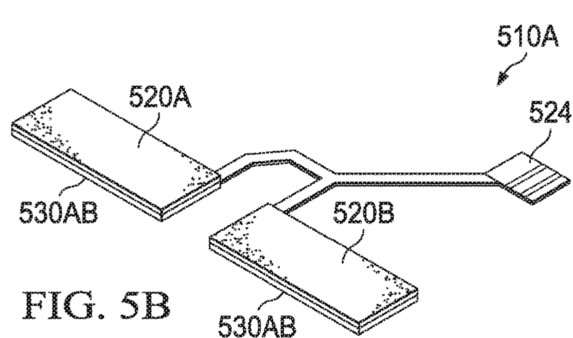
Figure 5C:
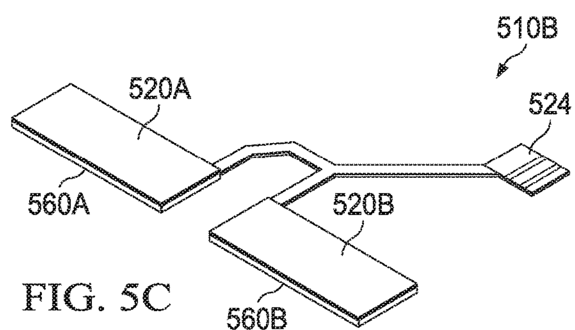
Figure 6:
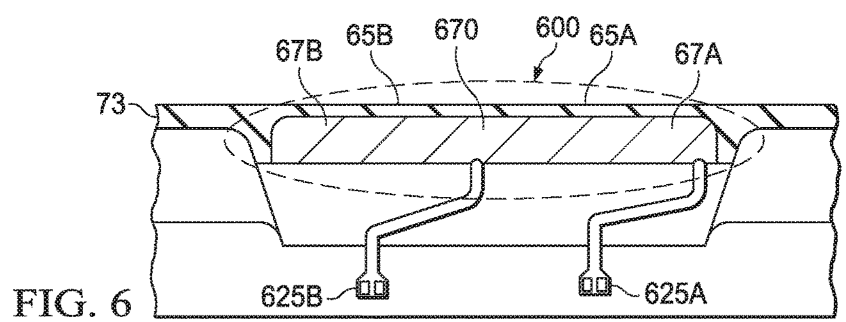
FIG. 6 illustrates an example alternate touch sensor structure [600], implemented for dual touch buttons [65A, 65B] with dual touch sensor slots [67A, 67B], and including conductive (copper) tape inserted into the dual touch sensor slots to complete a Faraday box around the inserted touch sensor (Flex PCB with elastic retention laminates), including the metal walls of the sensor slot, shielding the touch sensor from EMI (such as from wireless charging).

FIGS. 1A-1B illustrates an example mobile communications device case 10 including two dual touch buttons 15 (shown in detail in FIG. 1B), each touch button structure 100A including a touch sensor slot 17A and an inserted touch sensor assembly 101A. FIGS. 2A-2C illustrates an example touch sensor assembly 210, with an example touch sensor 220 implemented as a Flex PCB 221, and with front/back-side elastic retention laminates 230AB. FIGS. 3A-3D illustrate an example touch sensor structure 300 with a touch sensor slot 37, including insertion of a touch sensor assembly 310 with front/back-side elastic retention laminates 330AB, including compression of the elastic retention laminates for insertion (FIG. 3B), and decompression after insertion (FIG. 3C) to contact the slot walls and secure the touch sensor assembly within the touch sensor slot. FIGS. 4A-4B illustrate example device configurations 40A, 40B. FIGS. 5A-5C illustrate example alternate dual touch sensor assembly configurations 510A, 510B, the configuration 510B in FIG. 4C including a conductive laminate (such as copper) over the front/back-side elastic retention laminates [530AB] such as for use with a plastic device case (including plastic touch sensor slot). FIG. 6 illustrates an example alternate dual touch sensor structure 600 with dual touch sensor slots 67A/67B, and including conductive (copper) tape inserted into the touch sensor slots to complete a Faraday box around the inserted touch sensors to provide EMI shielding.

FIGS. 1A-1B illustrates an example mobile communications device case 10, including a sidewall 13 and a back panel 13. FIGS. 4A-4B illustrate alternate back panel configurations.

Two dual touch buttons 15 are formed in sidewall 13. Each touch button is formed by a touch button structure, exemplified by touch button 15A and example touch button structure 100A. The example dual touch button structure includes dual touch buttons 15A/15B, with dual touch button structures 100A/100B Touch button structure 100A (100B) includes a touch sensor slot 17A (17B), and an inserted touch sensor assembly 110A (110B). The touch sensor slot 17A is formed in sidewall 13, at the interior side of the touch button area 15A. The inserted touch sensor assembly 110A], the touch sensor assembly retained/secured within the touch sensor slot by elastic retention laminates, according to aspects of this Disclosure.

FIG. 1B illustrates detail of the touch button area 15 of device sidewall 13, including the two dual touch buttons and associated touch sensor slots. Dual touch buttons 15A/15B are formed by respective touch button structures 100A/100B that including dual touch sensor slots 17A/17B. Dual sensor slots 17A/17B are formed in slot-extended areas 13E of sidewall 13.

FIGS. 2A-2C illustrates an example touch sensor assembly 210. A touch sensor assembly 210 includes a touch sensor component 220, and front/back-side elastic, insulating retention laminates 230AB. The example touch sensor component is configured for inductive touch sensing. Alternative touch sensing technologies are capacitive sensing (with a capacitive sense electrode), and resistive sensing with a pressure-sensitive resistor.

FIG. 2A illustrates an example touch sensor component 220, implemented as a touch sensor printed circuit board (PCB) 221, such as a flexible PCB (Flex PCB) 221. Flex PCB 221 includes a printed sense inductor coil 222 formed on a front-side 220FS of the Flex PCB. Trace interconnects connect the sense inductor coil 222 to a trace coupler 223 with connector pad 224, for coupling to sensor electronics (not illustrated) or to other circuitry (such as for touch processing.

For example, touch sensor electronics can be co-located on the Flex PCB, or can be remote from the touch sensor. Touch sensor electronics coupled to the touch sensor component 221, through connector 223/224, can be designed to provide excitation drive current to the sense inductor coil 222, creating a projected time varying magnetic sensing B-field, and to measure a sensor inductor coil characteristic (such as inductance or Q-factor) indicative of deflection of the touch button area, including the front-side touch sensor slot wall).

FIG. 2B illustrates an example elastic, insulating retention laminate 230. The example elastic retention laminate can be an elastic, insulating layer or pad that is elastically compressible and decompressible, and electrically insulating, and that can be affixed (such as adhered) to the front and back side of Flex PCB 221. Example laminate materials are memory foam and shock absorbing foam.

FIG. 2C illustrates an example touch sensor assembly 210, with front/back-side elastic retention laminates 230AB affixed to the example touch sensor Flex PCB 221. A trace connector 224 connects to the touch sensor Flex PCB 221.

FIGS. 3A-3D illustrate an example touch sensor structure 300 for a touch button 35. Touch sensor structure 300 includes an example touch sensor assembly 310, inserted within a touch sensor slot 37 in sidewall 33. Touch sensor assembly 310 includes a touch sensor (FIG. 2A, 220), represented by element 321, with front/back-side elastic retention laminates 330AB.

Figure 3A:
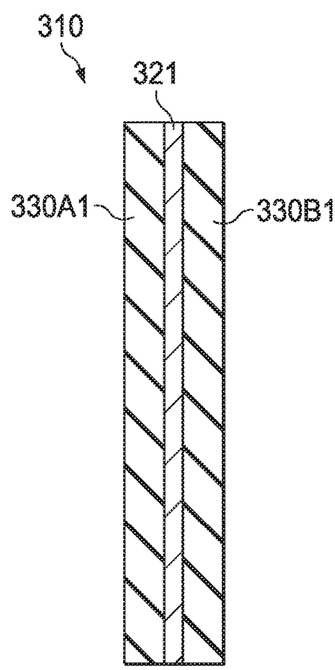
FIGS. 3A-3D illustrate an example touch sensor structure [300] for a touch button [35], including an example touch sensor assembly [310] inserted within a touch sensor slot, the touch sensor assembly including a touch sensor [321] with front/back-side elastic retention laminates [330AB]
Figure 3B:
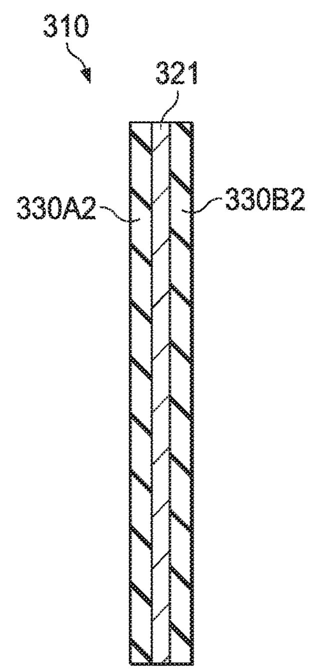

FIGS. 3A-3B illustrate the example touch sensor assembly 310. In FIG. 3A, the front/back-side elastic retention laminates are uncompressed 330A1/330B1. In FIG. 3B, the front/back-side laminates are compressed 330A2/330B2 for insertion into a touch sensor slot.

Figure 3C:
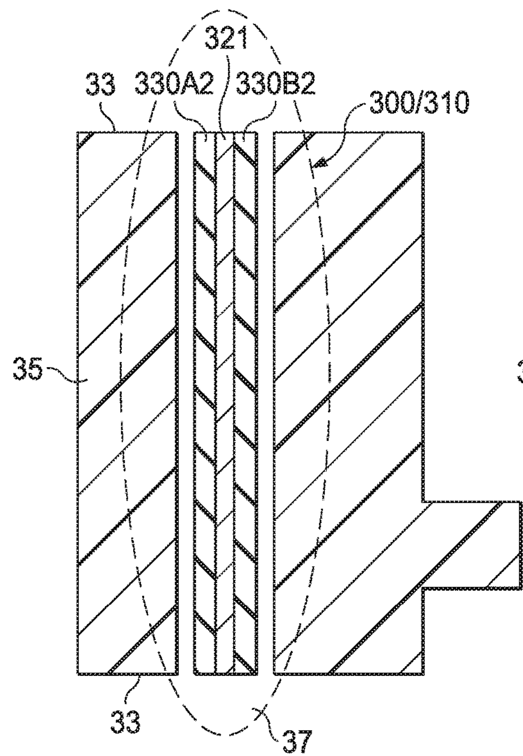
Figure 3D:
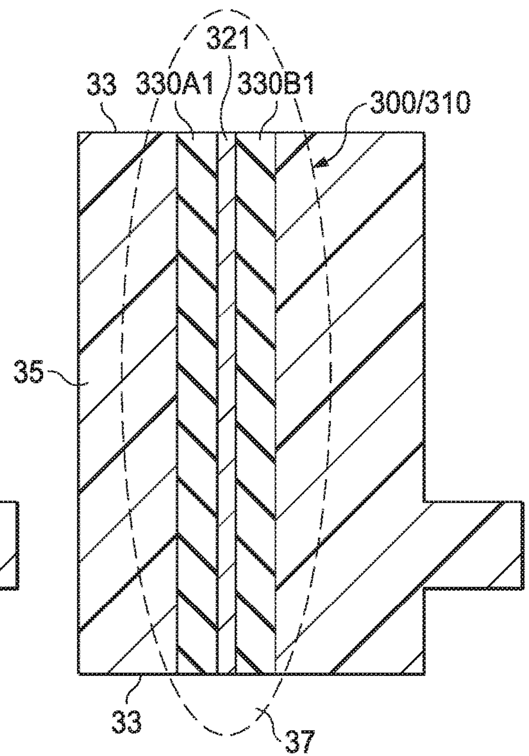

FIGS. 3C-3D illustrate an example touch button structure 300 with the example touch sensor assembly 310, including a touch sensor 321, inserted within a sensor slot 37 in device sidewall 33. FIG. 3C illustrates the front/back-side retention laminates compressed for insertion 330A2/330B2. FIG. 3D illustrates the front/back-side laminates after decompression (spring-back) 330A1/330B1.

After decompression, the touch sensor assembly 310 is secured within the touch sensor slot 37 by the decompressed front/back-side elastic retention laminates in contact with the slot walls. The decompressed front/back-side elastic retention laminates space the touch sensor 321 from the touch sensor slot walls, and in particular, the interior side of touch button area 35 (which forms the front-side slot wall), providing electrical insulation, while permitting deflection/displacement of the touch button slot wall toward the touch sensor 321 in response to a touch-press condition.

For the example implementation based on inductive sensing, the insertable touch sensor 321 includes a sense inductor coil (FIG. 2, 222). When inserted into the touch sensor slot 37 formed at the touch button area 35 of the device case 30, the front-side touch sensor slot wall at the interior side of the touch button area 35 (or, for example, a conductive laminate adhered to at least the front-side elastic retention laminate 330A, as described in connection with FIG. 5C) forms a conductive target, insulated from the touch sensor 321 (sense inductor coil) by the compressible, elastic retention laminate 330. A button-press deflection of a touch button area causes a deflection of at least the front-side touch sensor slot wall toward the inserted touch sensor 321 (FIG. 2, Flex PCB 221 with sense inductor coil element 222), compressing the elastic retention laminates 330AB on either side of the inserted touch sensor component. This elastic compression of the front/back-side elastic retention laminates 330 causes a change in the distance between the touch sensor 321 (sense inductor coil), and the conductive targets formed by either conductive touch sensor slot walls (conductive device body), or, for example, a conductive laminate on at least the front-side elastic retention laminate 330A. This touch-deflection is manifested as a change in coil inductance (or a property of the inductive touch sensor related to inductance).

FIGS. 4A-4B illustrate example devices 40A and 40B with touch buttons 45, implemented with example touch sensor structures 400. The touch sensor structures 400 include example touch sensor assemblies 410, represented by touch sensor element 421, secured within a touch sensor slot 47 in sidewall 43 by front/back-side elastic retention laminates 430A/430B.

FIG. 4A illustrates an example device 40A with a back panel 44A adhered to the bottom of the touch sensor slot 47, and with a display panel 90 adhered at the top of the sensor slot. FIG. 4B illustrates an alternate example device 40B with a monolithic back panel 44B (at the bottom of the touch sensor slot 47), and with the display panel 90 adhered to the top of the touch sensor slot.

FIGS. 5A-5C illustrate example dual touch sensor assemblies 510A, 510B, including dual touch sensor PCBs 520 (521A/521B) with a center coupler 523/524. FIG. 5A illustrates the dual touch sensor 520 including dual touch sensor PCBs 521A/521B.

FIG. 5B illustrates an example dual touch sensor assembly 510A with dual touch sensors 521A, 521B, and with associated front/back-side elastic retention laminates 530AB. FIG. 5C illustrates an alternate example dual touch sensor assembly 510B with dual touch sensors 521A, 521B, and with a conductive laminate (such as copper) over the front/back-side elastic retention laminates 530AB, such as for use with a plastic device case (including plastic touch sensor slot. Deflection/displacement of the touch button sidewall (nonconductive plastic) in contact with the conductive laminate causes deflection/displacement of the conductive laminate which substitutes for a conductive (metallic) touch sensor slot sidewall as the conductive target.

FIG. 6 illustrates an example alternate touch sensor structure 600, implemented for dual touch buttons 65A, 65B with dual touch sensor slots 67A, 67B. Conductive tape, such as copper or aluminum, is inserted into the dual touch sensor slots to complete a Faraday box around the inserted touch sensor (such as a touch sensor Flex PCB with elastic retention laminates. The Faraday box includes the metal walls of the sensor slot, and shields the touch sensor from EMI (such as from wireless charging).

The Disclosure provided by this Description and the Figures sets forth example embodiments and applications illustrating aspects and features of the invention, and does not limit the scope of the invention, which is defined by the claims. Known circuits, connections, functions and operations are not described in detail to avoid obscuring the principles and features of the invention. These example embodiments and applications, including example design considerations, can be used by ordinarily skilled artisans as a basis for modifications, substitutions and alternatives to construct other embodiments, including adaptations for other applications.

The invention claimed is:

1. A structure for use in a device including at least one touch button for touch input, the device including a touch button area defined on a device wall to include an exterior touch button surface, the structure comprising:

a sensor slot with front-side and back-side slot walls formed in the device wall at the touch button area, an interior surface of the touch button area forming the front-side slot wall; and a sensor component inserted within the sensor slot, spaced from the front-side and back-side slot walls, the sensor component including a sense element operable to sense a touch-deflection of the front-slide slot wall toward the sense element in response to a touch-press of the touch button surface; and front-side and back-side elastic retention laminates affixed respectively to a front-side and a back-side of the sense element, the front-side and back-side elastic retention laminates being compressible for insertion of the sensor component into the sensor slot;

when the sensor component is inserted within the sensor slot, the front-side and back-side elastic retention laminates being decompressible to contact respectively the front-side and back-side slot walls.

2. The structure of claim 1, wherein, when the sensor component is inserted within the sensor slot and the front-side and back-side elastic retention laminates are decompressed to contact respectively the front-side and back-side slot walls, then the front-side and the back-side elastic retention laminates insulate the sense element from the front-side and back-side slot walls; and at least the front-side elastic retention laminate is compressible in response to a touch press of the touch button surface that causes a deflection of the front-side slot wall in the direction of the sense element.

3. The structure of claim 1, wherein the front-side and back-side elastic retention laminates are formed from one of memory foam and shock absorbing foam.

4. The structure of claim 1, wherein the sense element comprises a flexible printed circuit board.

5. The structure of claim 1, wherein the sense element includes one of: a sense inductor coil; a capacitive electrode, a pressure-sensitive resistive element.

6. The structure of claim 1, wherein the device case is formed from one of a conductive material and a nonconductive material, such that the slot walls are respectively conductive and nonconductive.

7. The structure of claim 6, wherein the slot walls are non-conductive, and the sensor component further comprises:

a conductive laminate affixed to the front-side elastic retention laminate.

8. The structure of claim 6, wherein the slot walls are conductive, and further comprising conductive shield to form, with at least the conductive slot walls, a Faraday box around the sense element.

9. The structure of claim 1, wherein the device is a mobile communications device.

10. An assembly for use in a device including at least one touch button for touch input, the device including a touch button area defined on a device wall to include an exterior touch button surface, the device including a sensor slot with front-side and back-side slot walls formed in the device wall at the touch button area, an interior surface of the touch button area forming the front-side slot wall, the assembly comprising:

a sensor component, including a sense element operable to sense a touch-deflection of the front-slide slot wall toward the sense element in response to a touch-press of the touch button surface; and front-side and back-side elastic retention laminates affixed respectively to a front-side and a back-side of the sense element, the front-side and back-side elastic retention laminates being compressible for insertion of the sensor component into the sensor slot;

when the sensor component is inserted within the sensor slot, the front-side and back-side elastic retention laminates being decompressible to contact respectively the front-side and back-side slot walls.

11. The assembly of claim 10, wherein, when the sensor component is inserted within the sensor slot and the front-side and back-side elastic retention laminates are decompressed to contact respectively the front-side and back-side slot walls, then the front-side and the back-side elastic retention laminates insulate the sense element from the front-side and back-side slot walls; and at least the front-side elastic retention laminate is compressible in response to a touch press of the touch button surface that causes a deflection of the front-side slot wall in the direction of the sense element.

12. The assembly of claim 10, wherein the front-side and back-side elastic retention laminates are formed from one of memory foam and shock absorbing foam.

13. The assembly of claim 10, wherein the sense element comprises a flexible printed circuit board.

14. The assembly of claim 10, wherein the sense element includes one of: a sense inductor coil; a capacitive electrode, a pressure-sensitive resistive element.

15. The assembly of claim 10, wherein the device case is formed from one of a conductive material and a nonconductive material, such that the slot walls are respectively conductive and nonconductive.

16. The assembly of claim 15, wherein the slot walls are non-conductive, and the sensor component further comprises:

a conductive laminate affixed to the front-side elastic retention laminate.

17. The assembly of claim 15, wherein the slot walls are conductive, and further comprising conductive shield to form, with at least the conductive slot walls, a Faraday box around the sense element.

18. A method of providing touch input to a device including at least one touch button area defined on a device wall to include an exterior touch button surface, the method comprising:

forming in the device wall at the touch button area a sensor slot with front-side and back-side slot walls, an interior surface of the touch button area forming the front-side slot wall;

providing a sense element operable to sense a touch-deflection of the front-slide slot wall toward the sense element in response to a touch-press of the touch button surface;

affixing to the sense element front-side and back-side elastic retention laminates affixed respectively to a front-side and a back-side of the sense element;

compressing the front-side and back-side elastic retention laminates;

inserting the sense elements with front-side and back-side elastic retention elements compressed into the sensor slot; and allowing the front-side and back-side elastic retention laminates to decompress to contact respectively the front-side and back-side slot walls.

19. The method of claim 18, wherein, when the sense element is inserted within the sensor slot and the front-side and back-side are decompressed to contact respectively the front-side and back-side slot walls, then further comprising sensing a touch press of the touch button area that causes a deflection of the front-side slot wall in the direction of the sense element, that compresses at least the front-side elastic retention laminate.

20. The method of claim 18, wherein the sense element includes one of: a sense inductor coil; a capacitive electrode, a pressure-sensitive resistive element.

* * * * *